Aug. 29, 1961 J. H. TRAUTMANN 2,998,115
MODULAR CONVEYOR
Filed March 31, 1958 3 Sheets-Sheet 1
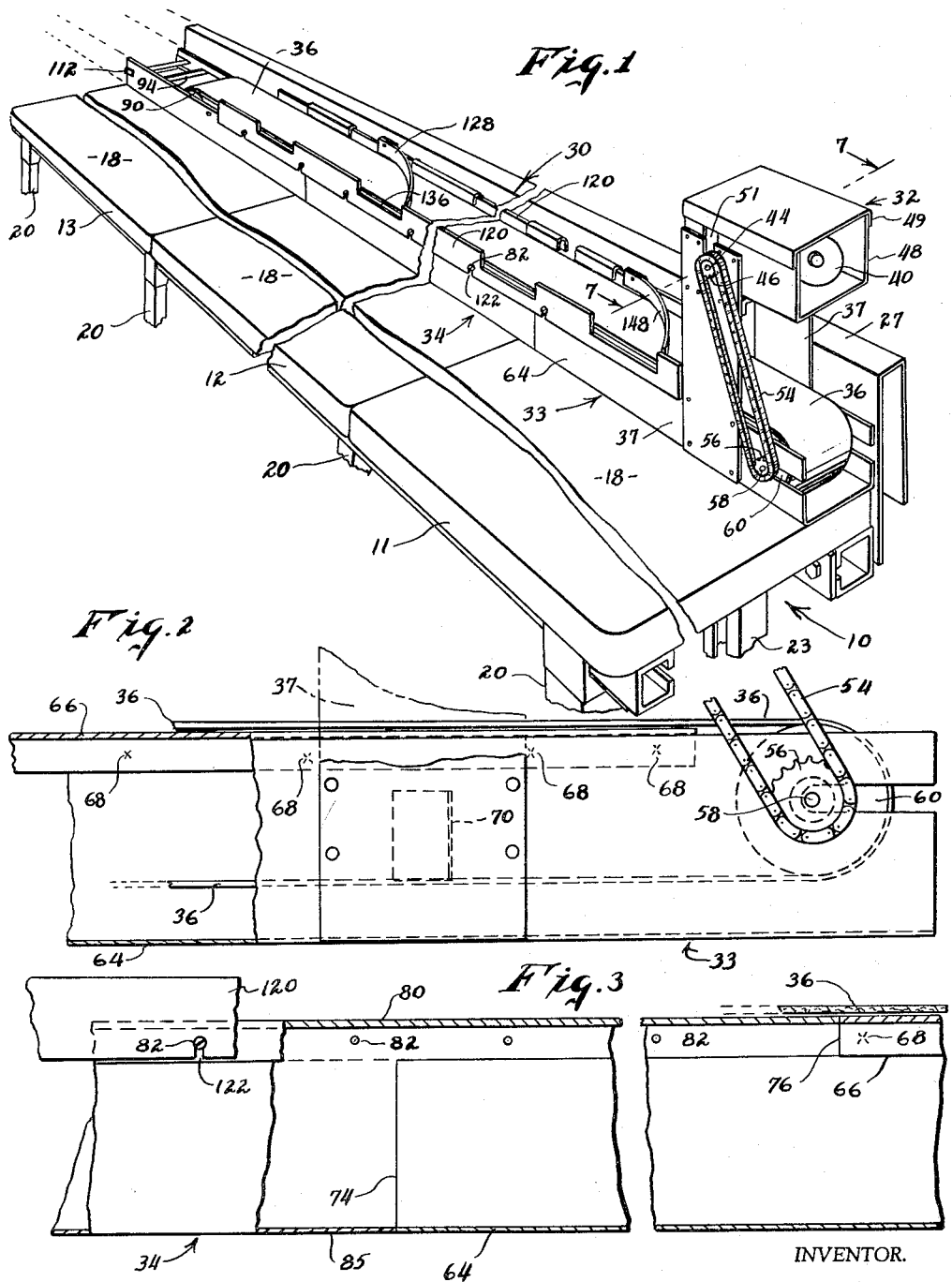
INVENTOR.
John H. Trautmann
BY Emery, Whittemore
Sanford & Pix
ATTORNEYS

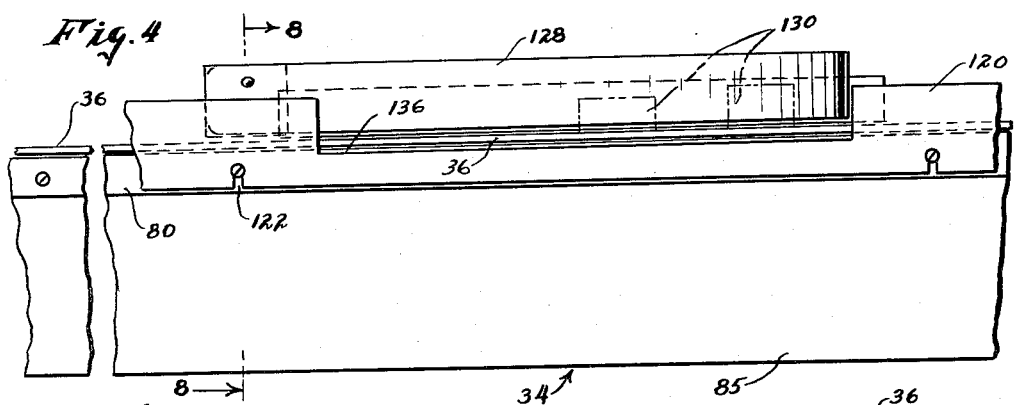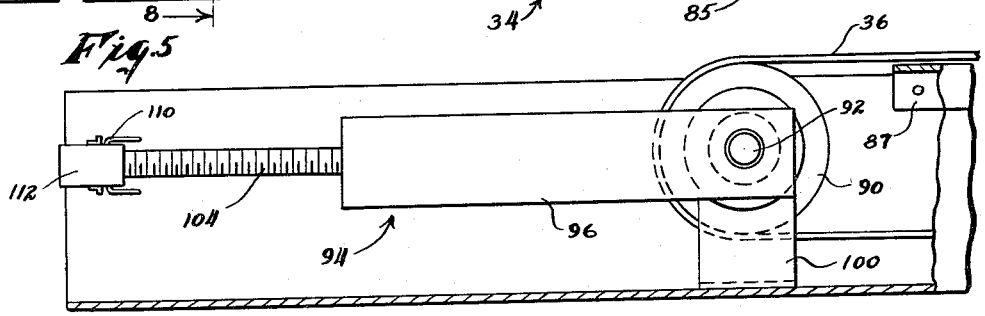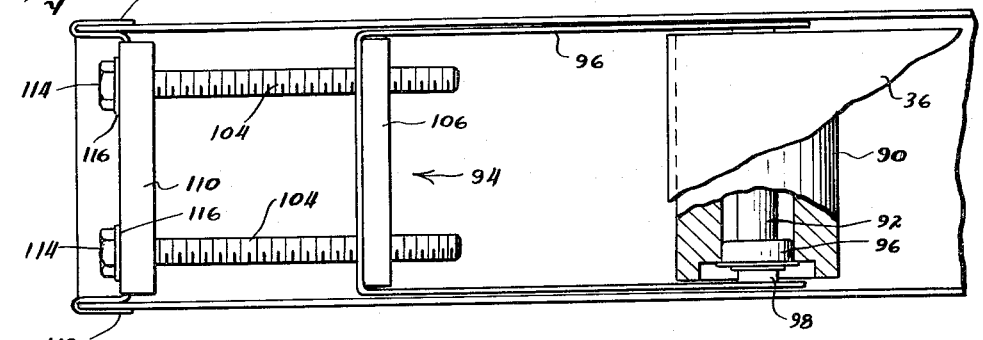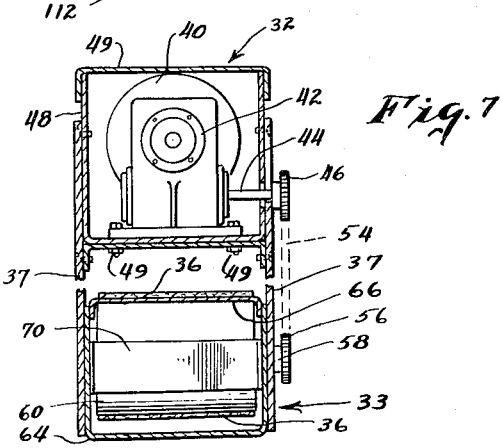

Aug. 29, 1961 J. H. TRAUTMANN 2,998,115
MODULAR CONVEYOR
Filed March 31, 1958 3 Sheets-Sheet 3
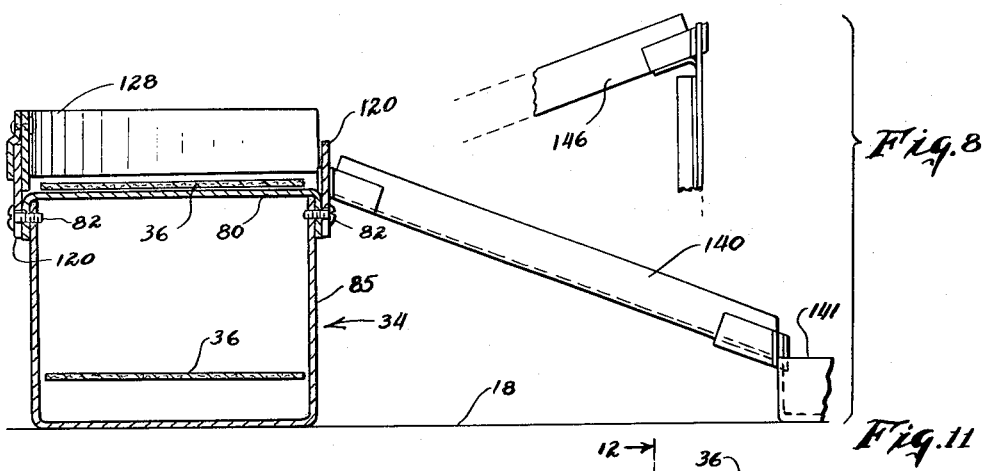
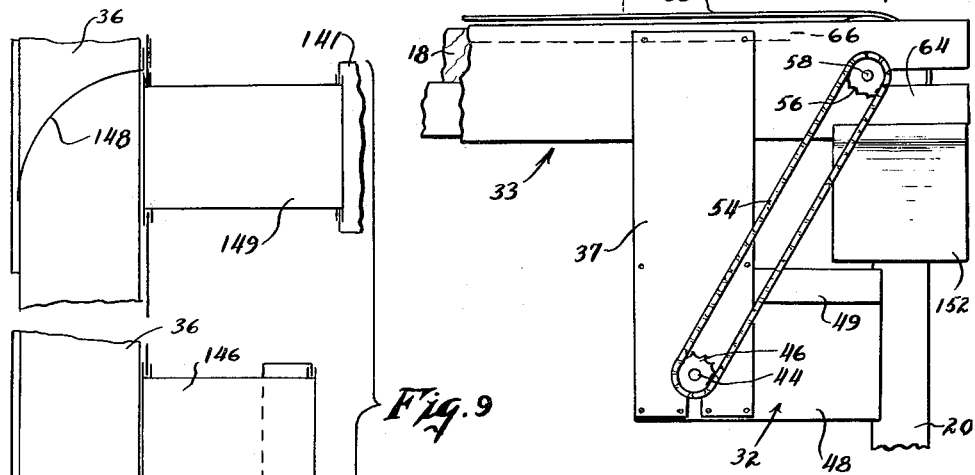
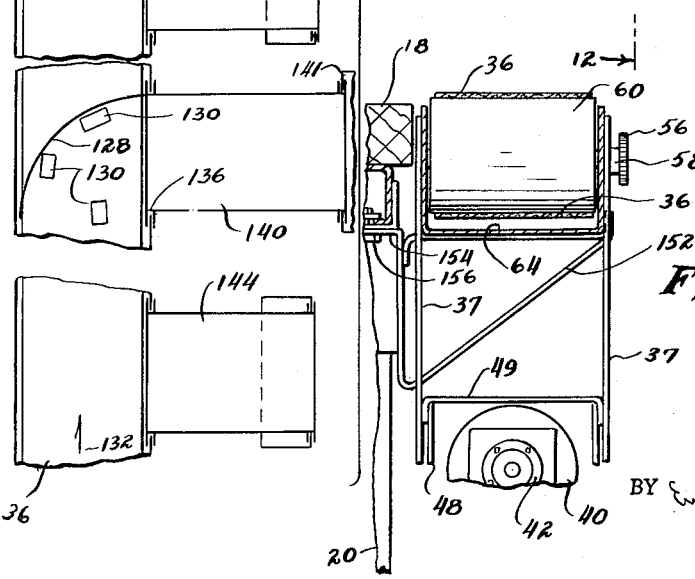
INVENTOR.
John H. Trautmann
BY Emery, Whittemore,
Sandoe & Dix
ATTORNEYS United States Patent Office 2,998,115
Patented Aug. 29, 1961

2,998,115
MODULAR CONVEYOR
John H. Trautmann, Southbury, Conn., assignor to Richard E. Deutsch, doing business as Products For Industry, Stamford, Conn., a sole proprietorship
Filed Mar. 31, 1958, Ser. No. 725,265
12 Claims. (Cl. 198—19)

This invention relates to conveyors and to the combination of a conveyor with a work bench system, the construction being such that the conveyor can be extended in modules which are related to modules of the bench system which is also extensible.

It is an object of this invention to provide a modular and extensible conveyor which is supported on a modular work bench system and made in sections so that it can be increased in length or decreased in accordance with similar changes in the work bench system. In the preferred construction, the conveyor includes a housing which is supported on the bench top at the rearward end of the bench top and with the conveyor up against parts of a rearward frame of the work bench system. In modified constructions the conveyor can be supported from the front of the bench and at a location which places the top run of the conveyor belt substantially flush with the top surface of the bench top or working surface of the bench.

Another object of the invention is to provide an improved conveyor which is of simple and rugged construction and which extends for the length of a long work bench system with means for loading the work pieces, from a bench station, on the conveyor for transfer to another work station along the same bench system, and with means for automatically discharging the work pieces at the other station along the bench system. After further work has been done on the pieces at this other station, they are again placed on the conveyor and carried on to still another station for further work or to a discharge or delivery station at the end of the work bench system.

Features of the invention relate to the simplified construction of the conveyor and the combinations of parts which make the changes in length of the conveyor quick and convenient to make. Another feature relates to the supporting means for an idler pulley of the conveyor belt; and to the frame by which the idler pulley is connected with the conveyor housing for adjustment of the belt tension. This frame is constructed in such a way as to engage an open end of the housing without any special construction of the housing; and it is thus possible to connect it with any extensions of the housing which are added for lengthening the conveyor and to connect it to whatever end portion of the housing may be left when parts of the conveyor are removed to shorten it for a work bench system of reduced length.

The conveyor of this invention is preferably a self-contained unit which can be removed from the bench for transfer to other benches or for storage during such times as it is not needed. It also provides a conveyor which can be installed on an existing work system without any alteration in construction of the bench system.

Other objects, features and advantages of this invention will appear or be pointed out as the description proceeds.

In the drawing, forming a part hereof, in which like reference characters indicate corresponding parts in all the views;

FIGURE 1 is a perspective view showing a work bench system equipped with the conveyor of this invention;

FIGURE 2 is a fragmentary, enlarged, side elevation showing the motor and driving end of the conveyor of FIGURE 1;

FIGURES 3 and 4 are fragmentary, enlarged side elevations, partly broken away and in section, of intermediate portions of the conveyor shown in FIGURE 1;

FIGURE 5 is a fragmentary, enlarged, side view, mostly in section, showing the end of the conveyor of FIGURE 1 which is most remote from the motor;

FIGURE 6 is a top plan view, partly broken away and in section, of the structure shown in FIGURE 5;

FIGURE 7 is a sectional view taken on the plane 7—7 of FIGURE 1;

FIGURE 8 is a sectional view on the line 8—8 of FIGURE 4 and with a discharge chute connected to the side wall of the conveyor;

FIGURE 9 is a diagrammatic, top plan view, of a portion of the conveyor, showing the location of successive loading and discharge chutes at different stations along the length of the conveyor;

FIGURE 10 is a sectional view, similar to FIGURE 7, but showing the conveyor modified and located along the front of the work bench system;

FIGURE 11 is a side view of the modified construction shown in FIGURE 10; and

FIGURE 1 shows a work bench system 10 composed of three work bench sections 11–13. Each work bench sections includes a bench top 18; and these bench tops are in end-to-end abutting relation and form a continuous flush working surface.

The bench tops 18 are supported by the frame of the work bench system. The frame includes front leg assemblies 20 and a rearward frame 22 having back legs 23 of which only one is shown in FIGURE 1. It will be understood, however, that these legs 23 are preferably located behind the front legs 20, and in the preferred construction they have extensions projecting upwardly above level of the bench tops 18 and with a back panel 27 forming a continuous low wall at the back of the bench tops 18.

The work bench system 10 is of modular construction, the modules being preferably the longitudinal length of each of the bench tops 18 or one-half the length of the bench tops, or some other convenient fraction; and the bench system can be extended to any desired length by merely adding sections, or can be shortened as much as necessary by removing sections. A conveyor 30 rests on the bench tops 18 and is located against the back panel 27, or against the extensions of the rearward legs when no back panel is supplied with the bench system. This conveyor 30 is shown extending for the full length of the bench system 10, but its length for any particular installation depends upon how much of the bench system requires conveyor facilities. The conveyor is of modular construction so that it can be lengthened or shortened to accommodate changed conveyor requirements of the bench system, as well as changes in the length of the bench system.

The conveyor includes a housing consisting of a motor section 32, a conveyor drive section 33 and an extended section 34 which is made up of a number of successive channels when the conveyor is of substantial length. An endless belt 36 passes around pulleys near opposite ends of the conveyor housing, and an upper run of this belt 36 passes over the top of the conveyor housing. The return run of the belt 36 is located in the housing.

The motor section 32 is located above the conveyor drive section and is carried by supports 37 attached to the housing at both the front and the back of the conveyor. These supports 37 hold the motor section at a level above the conveyor belt so that there is clearance between the belt and the bottom of the motor housing for the passage of work pieces traveling along the conveyor for discharge at the right-hand end of the conveyor. An electric motor 40 is located within the motor section 32. The armature shaft of the motor extends lengthwise of the conveyor and there is reduction gearing 42 (FIGURE 7) at one end of the motor 40 for transmitting rotation of the motor to a driven shaft 44 which extends through the side of the motor section 32. A sprocket 46 is secured to the portion of the shaft 44 which extends from the driving section 33 of the housing.

FIGURE 1 shows the motor section 32 of the conveyor housing with one end open. This section is made up of a lower channel 48 and an upper channel 49 which serves as a cover for the section. There is a slot 51 in the side wall of the lower channel 48, providing clearance for the shaft 44. FIGURE 7 shows the reduction gearing 42 attached to the lower channel 48 by bolts 49. The motor 40 is attached to and supported by the housing of the reduction gearing.

The sprocket 40 drives a chain 54 which passes around another sprocket 56 on the end of an axle 58 supporting a driving pulley 60. The conveyor belt 36 passes around the pulley 60, and this belt is under sufficient tension to develop the pressure and friction necessary for driving the belt from its contact with the driven pulley 60.

The conveyor drive section 33 includes a lower channel 64 and an upper channel 66. This upper channel 66, which forms the top of the conveyor drive section 33, supports the belt 36 along the conveyor drive section and the top of the pulley 60 is substantially tangent with the plane of the top surface of the upper channel 66.

FIGURE 7 is a sectional view through a portion of the conveyor drive section 33 some distance inward from the pulley 60. The lower channel 64 has high side walls which extend almost to the top of the housing; and the upper channel 66 has short side walls located within the side walls of the lower channel 64 and permanently connected to the side walls of the lower channel by spot welding 68. This conveyor drive section 33 is further braced by a cross tie 70 having legs at its opposite ends spot welded to the sides of the lower channel 64.

The end of the lower channel 64 is indicated by the reference character 74 in FIGURE 3. The upper channel 66 is of shorter length; its termination being indicated by the reference character 76. If the conveyor is to be used on a work bench system comprising only a single section, then the portion of the conveyor drive section beyond the location 76 is covered by a short length of channel equal to a fraction of a module of the conveyor; but there is ordinarily no purpose in using the conveyor with such a short bench system.

These is another upper channel 80 extending across the top of the lower channel 64 and having downwardly extending side walls which may come either inside or outside of the side walls of the lower channel 64, though in the illustrated construction, the side walls of the upper channel 66 are shown outside of the side walls of the lower channel 64. One end of the upper channel 80 abuts the end of the opper channel 66 at the location 76. There are rows of holes in the side walls of the channels 64 and 80 for receiving fastening means, preferably screws 82 for attaching the upper channel 80 to the lower channel 64. These screws 82 are preferably self-tapping screws, but other fastening means can be used.

A lower channel 85 of the extended section 34 of the conveyor abuts against the lower channel 64 at the location 74. The portion of the upper channel 80 which extends beyond the location 74 overlaps the lower channel 85 and is connected to it by screws 82 in the manner already described for the channels 64 and 80. The lower channel 85 extends beyond the end of the upper channel 80 in the same way as the lower channel 64 extends beyond the upper channel 66; and there is another upper channel 87 which continues the housing beyond the upper channel 80.

It is a feature of the invention that the regions of abutment of the successive lower channels of the housing are staggered with respect to the regions of abutment of the ends of the successive upper channels so that each lower channel forms the connecting piece for joining successive upper channels, and similarly, each upper channel forms the piece for joining successive sections of the lower channels. With this construction a strong and stiff conveyor housing is obtained and whenever it becomes desirable to terminate the conveyor housing a channel of half modular length is used for either the lower channel or the upper channel, depending upon which is needed to complete the conveyor housing.

At the end of the conveyor housing remote from the motor, there is an idler pulley 90 which has an axle 92 supported at its opposite ends in a frame 94. The frame 94 includes a yoke 96 which extends transversely across the conveyor housing as is best shown in FIGURE 6, and the opposite sides of the yoke 96 extend across the ends of the idle pulley 90 and have supports 98 for holding the opposite ends of the axle 92. The pulley 90 rotates on the axle 92 and preferably has bearings 99 fixed in counterbores at opposite ends of the pulley. There are downwardly extending legs 100 (FIGURE 5) at opposite sides of the yoke 96, and these legs support the yoke from the bottom of the conveyor housing.

Two long screws 104 extend through the yoke 96 and thread into a plate 106 attached to the yoke 96. The screws 104 extend freely through holes in a transversely extending portion 110 of the frame and there are brackets 112 at opposite ends of the transversely extending portion 110 of the frame with flat folds for receiving the side walls of the conveyor housing. Heads 114 of the screws 104 bear against the thrust washers 116 in contact with the transversely extending element 110.

The flat folds of the brackets 112 fit snugly over the side walls of any channel section of the conveyor housing and thus the frame that carries the idler pulley 90 can be hooked over the end of the housing without having any special construction for receiving this pulley-connected frame. The only change necessary when extending or contracting the conveyor is the provision of a longer or shorter conveyor belt, and the belts are supplied in modular lengths.

In order to increase the tension of the conveyor belt, the screws 104 are rotated in a direction to draw the yoke 96 toward the transversely extending element 110. Conversely, tension of the conveyor belt can be relaxed by rotating the screws 104 in the opposite direction so as to permit the tension of the belt to pull the yoke 96 further away from the transversely extending frame element 110.

For some types of service where the work pieces are small and not sufficiently stable to insure their remaining in a particular location on the conveyor belt, it is necessary to have sides extending upwardly beyond the top of the conveyor belt. FIGURES 1, 3 and 8 show a side extension 120. This side extension is preferably a sheet metal panel which may have its upper edge folded over along part or all of the length of the side extension for greater rigidity; and the lower portion of the side extension 120 has openings through which the screws 82 extend.

In order to make it possible to place the side extension 120 on the conveyor or to remove it without having to remove the screws 82, the screw holes in the side extension 120 are elongated to form slots 122 extending all the way to the bottom edge of the side extension 120. It is possible, therefore, to merely loosen the screws 82 and slide the side extension 120 downwardly until the upper ends of the slot 122 are in contact with the screws 82 between the screw heads and the surface of the side wall of the upper channel 80. The screws 82 are then tightened to secure the side extension 120 in place.

FIGURE 8 shows side extensions 120 on both sides of the conveyor housing. At locations where work pieces are to be discharged from the conveyor at a work station along the bench system there is a sweep finger 128 secured to a side extension 120. This sweep finger causes work pieces 130 to be displaced toward the right in FIGURE 9 as the conveyor belt travels in the direction indicated by the arrow 132.

There is a depression 136, shown also in FIGURES 1 and 4, at the region of the conveyor where the sweep finger 128 causes the work pieces 130 to be displaced transversey of the belt. This depression 136 extends downwardly to the level of the belt and thus provides an exit through the side extension 120 for the discharge of the work pieces 130. A discharge chute 140 is connected to the conveyor housing at the depression 136 so that the work pieces 130 slide down the chute 140 onto the top surface of the bench top, or into a tray 141.

The side extensions 120 are supplied with cut-outs or depressions 136 at spaced regions along the length of each side extension; and when there is no need for such a cut-out or depression at a particular location, a filler piece 142 is snapped over the side extension and bridges the open area of the side wall extension.

In the operation of the invention, a sweep finger 128 and a discharge chute 140 are provided at each station along the work bench system where additional work is to be done on a work piece. After the operation at this work station has been performed, the operator ordinarily places the work pieces 130 back on the conveyor beyond the sweep finger 128 for transport of the work pieces to another work station where the next operation is to be performed. After the last operation has been performed, at some particular station along the work bench system, the operator places the work pieces back on the conveyor for transport to another automatic discharge station which is the final delivery station for the work pieces.

FIGURE 9 is a diagrammatic plan view showing a loading chute 144 into which work pieces are placed for discharge onto the conveyor belt 36. After traveling some distance along the conveyor belt, the work pieces reach the sweep finger 128 which causes automatic discharge of the work pieces to the unloading chute 140. At the lower end of this chute 140 the work pieces will ordinarily slide into the tray 141 or a tote box, or some other suitable container.

After the operation which is performed at the work station adjacent to the chute 140, the work pieces are returned to the conveyor for placing them in another loading chute 146 from which they drop onto the conveyor belt 36 and travel along the conveyor to another automatic unloading station having a sweep finger 148 similar to the sweep finger 128 already described. Another discharge chute 149 is located adjacent to the sweep finger 148 for delivering the work pieces to the bench top or a tray.

For some installations it is desirable to locate the conveyor along the longitudinal length of some or all of the work bench system, but without having the conveyor on the bench top 18. FIGURES 10 and 11 show a construction in which the top of the conveyor is slightly lower than the bench top 18. The conveyor may be located in this relation to the bench top at either the front or the back of the work bench system. In the construction illustrated in FIGURES 10 and 11, the conveyor is at the front of the work bench system.

The conveyor housing is supported from the frame of the work bench by brackets 152. FIGURES 10 and 11 show one such bracket 152 connected to the front leg assembly 20. The bracket 152 is attached to the front leg assembly by a bracket extension 154 secured to the front leg assembly by bolts 156.

The only difference in the conveyor itself, when modified in accordance with FIGURES 10 and 11, is that the motor housing 32 is placed below the conveyor and the supports 37 are changed so that they extend downwardly instead of upwardly. The construction is preferably designed so that the same chain 54 can be used regardless of whether the motor housing 32 is located below the conveyor as in FIGURES 10 and 11, or above the conveyor, as in FIGURE 1.

The preferred embodiment of the invention has been illustrated and described, but changes and modifications can be made, and some changes can be used in different combinations without departing from the invention as described in the claims.

What is claimed is:

1. A conveyor comprising a housing including a channel forming the top of the housing and having its open side facing downwardly, side walls overlapping the sides of the channel and extending for a substantial distance below the channel, the side walls having their lower ends turned inward under the channel to form a bottom for the housing, fastening means connecting the overlapping areas of the side walls and the channel together, said fastening means being releasable whereby they can also secure to the housing detachable and replaceable side wall extensions for projecting above to the top of the channel, pulleys at opposite ends of the channel and beyond the top of the housing formed by the channel and the side walls, an endless belt extending around the pulleys and having an upper run that rests on the top of the channel, and a lower run enclosed within the housing, a second housing, a motor enclosed within the second housing and at a different level from the housing formed by the channels, and driving mechanism connecting the motor with one of the pulleys.

2. The conveyor described in claim 1, and in which the channel and the side walls are of composite construction and each made up of modular length sections connected in end-to-end abutting relation, and the connections of adjacent sections of the channel are staggered with respect to connections of the sections of the side walls, and sections of the channel form the connecting pieces for joining sections of the side walls and vice versa.

3. A conveyor described in claim 2, and in which changes in the length of the conveyor housing are made by adding or subtracting channel sections and side wall sections intermediate the end sections which have the pulley, the pulley at the end of the housing remote from the motor being an idler pulley carried by a frame with brackets that engage end edges of the side walls.

4. The conveyor described in claim 3, and in which the brackets clip over the end edges of the side walls and the frame includes tensioned elements reacting against the brackets and urging the pulley to move in a direction to tension the belt.

5. The conveyor described in claim 4, and in which the brackets are flat folded ends of a transversely extending element of the frame and at each end of the bracket there are confronting faces on opposite sides of the fold which slide over opposite sides of side walls of the housing to anchor the pulley frame to the end of the housing.

6. The conveyor described in claim 4, and in which the idler pulley has an axle carried by a yoke which forms part of the frame, and there are long screws connecting the yoke with the transversely extending element between the brackets, and the screws are rotated one way or the other to vary the tension of the conveyor belt.

7. The conveyor described in claim 1, and in which the housing includes a basic portion in which the motor and driving pulley are located and in which the channel and side walls are permanently connected together, and there is a supporting bracket connecting the second housing with the first housing, and the supporting bracket is movable into different positions to locate the motor housing selectively above or below the top run of the conveyor belt.

8. A conveyor comprising a housing including a channel forming the top of the housing and having its open side facing downwardly, the side walls overlapping the sides of the channel and extending for a substantial distance below the channel, the side walls having their lower ends turned inward under the channel to form a bottom for the housing, fastening means connecting the overlapping areas of the side walls and the channel together, pulleys at opposite ends of the channel and beyond the top of the housing, an endless belt extending around the pulleys and having an upper run that rests on the top of the channel, and a lower run enclosed within the housing, and a side extension overlapping the side wall and the side of the channel on at least one side of the housing, the side extension projecting upwardly beyond the top of the channel and above the conveyor belt, the fastening means that connect the side wall and the side of the channel being detachable and also connecting the side extension to the housing.

9. The conveyor described in claim 8 and in which the side extension is a metal panel having openings for the passage of the detachable fastening means, said openings being elongated downwardly and extending all the way to the lower edge of the panel whereby the panel can be slid over the detachable fastening means when the latter are loosened and without removing the detachable fastening means from the housing.

10. The conveyor described in claim 8 and in which the side extension has an elongated recess in its upper edge extending down to the level of the top run of the conveyor belt and there is a finger extending transversely of the conveyor belt for deflecting work pieces on the conveyor belt sidewise and off the belt through said recess.

11. The combination with a modular and extensible work bench system having successive sections connected together to make a bench system of greater longitudinal extent, of a conveyor having a housing made up of successive modular sections corresponding to modules of the work bench system and supported by the work bench system and extending lengthwise thereof, detachable and replaceable loading stations at spaced regions along the length of the conveyor, and a detachable and replaceable automatic unloading element at a station beyond each loading station whereby work pieces are delivered by the conveyor to successive work stations along the bench system and to a delivery station at one end of the bench system.

12. The combination described in claim 11 and in which the conveyor housing is located on top of a working surface of the work bench system and at the back of said working surface against portions of a back frame of the work bench system.

References Cited in the file of this patent

UNITED STATES PATENTS

| | | |
|---|---|---|
| 1,780,118 | D'Humy | Oct. 28, 1930 |
| 1,808,421 | Liggett | June 2, 1931 |
| 2,038,471 | Benatar | Apr. 21, 1936 |
| 2,288,159 | Ernst | June 30, 1942 |
| 2,359,464 | Carothers et al. | Oct. 3, 1944 |
| 2,523,829 | Hubbell | Sept. 26, 1950 |